(12) United States Patent
Nishikawa et al.

(10) Patent No.: US 6,654,509 B2
(45) Date of Patent: Nov. 25, 2003

(54) IMAGE PROCESSING APPARATUS, METHOD, AND SYSTEM

(75) Inventors: Satoshi Nishikawa, Yokohama (JP); Koji Nakagiri, Kawasaki (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/342,921

(22) Filed: Jun. 30, 1999

(65) Prior Publication Data

US 2003/0202716 A1 Oct. 30, 2003

(30) Foreign Application Priority Data

Jul. 1, 1998 (JP) .......................... 10-186514
Jun. 9, 1999 (JP) .......................... 11-162976

(51) Int. Cl.$^7$ ................................ G06K 9/40
(52) U.S. Cl. .................. 382/298; 382/162; 358/1.2; 358/451
(58) Field of Search ................. 382/240, 264, 382/162, 163, 164, 165, 166, 167, 448, 267, 268, 269, 298, 232, 220; 358/1.15, 1.2, 451; 707/104.1, 1

(56) References Cited

U.S. PATENT DOCUMENTS

| | | | | |
|---|---|---|---|---|
| 5,146,343 A | * | 9/1992 | Fujii | 358/296 |
| 5,682,441 A | * | 10/1997 | Ligtenberg et al. | 382/232 |
| 6,120,197 A | * | 9/2000 | Kawamoto et al. | 400/61 |
| 6,344,907 B1 | * | 2/2002 | Watanabe et al. | 358/448 |

OTHER PUBLICATIONS

U.S. patent application Ser. No. 09/123,366, filed Jul. 28, 1998.

* cited by examiner

*Primary Examiner*—Jayanti K. Patel
*Assistant Examiner*—Seyed Azarian
(74) *Attorney, Agent, or Firm*—Fitzpatrick, Cella, Harper & Scinto

(57) ABSTRACT

When a plurality of color conversion results of an image are to be thumbnail-output, all areas of the image are reduced, and the conversion results may be hard to recognize or the printing through put may become low. In this invention, only part of image data to be thumbnail-output is temporarily held in a spool file. A plurality of types of image processing are performed for the held first image data to generate a plurality of second image data. The plurality of second image data are laid out on one page and output to a printer. With this arrangement, information sufficient to recognize the color conversion results in the image can be thumbnail-output in a short time.

15 Claims, 20 Drawing Sheets

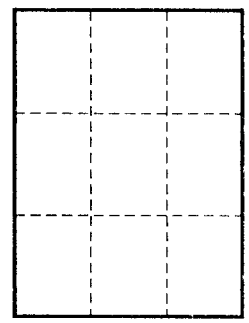
F I G. 16A
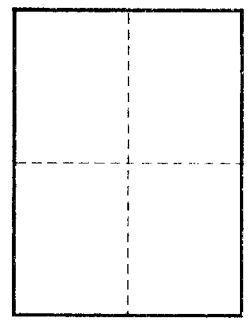
F I G. 16B
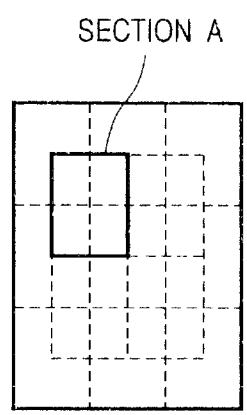
F I G. 16C
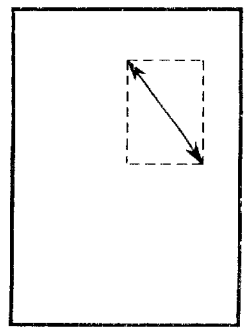
F I G. 16D

IMAGE PROCESSING APPARATUS, METHOD, AND SYSTEM

BACKGROUND OF THE INVENTION

The present invention relates to an image processing apparatus, method, and system for thumbnail output of an input image.

A conventional image processing apparatus capable of reducing a plurality of images and printing them on one page, i.e., so-called thumbnail output is known.

In the conventional image processing apparatus capable of thumbnail output, for example, when a plurality of parameters for color conversion are designated for one image, and color conversion results by the parameters are reduced and printed on one page, the color conversion results by different parameters can be recognized at a glance.

However, in the conventional image processing apparatus capable of thumbnail output, when the color conversion results by different color conversion parameters are thumbnail-output, all areas of the original image are reduced and output. Hence, depending on the image, differences in color conversion between parameters can hardly be recognized due to reduction.

In addition, since reduction processing must be performed for all areas of original image data in units of parameters, i.e., a plurality of number of times, the throughput of printing becomes low.

SUMMARY OF THE INVENTION

Accordingly, it is an object of the present invention to provide an image processing apparatus, method, and system capable of thumbnail output at a high speed to allow easy confirmation of a plurality of image processing results of an image.

According to the present invention, the foregoing object is attained by providing an image processing apparatus comprising: input means for inputting first image data; spool means for temporarily holding part of the first image data; image processing means for performing a plurality of types of image processing for the first image data held by the spool means to generate a plurality of second image data; and output means for outputting the plurality of second image data generated by the image processing means.

With this arrangement, a plurality of types of image processing need only be performed for minimum required image data to confirm the processing result.

And it is another object of the present invention to provide an image processing apparatus, method, and system for performing thumbnail output in accordance with the sizes of objects in an image.

According to the present invention, the foregoing object is attained by providing an image processing apparatus comprising: input means for inputting first image data; spool means for temporarily holding the first image data; color conversion means for performing color conversion processing for the first image data held by the spool means using a plurality of different parameters to generate a plurality of second image data; and output means for changing a size of the plurality of second image data generated by the color conversion means and thumbnail-outputting the second image data, wherein the spool means holds objects in the first image data in accordance with sizes of the objects.

With this arrangement, only objects having sizes sufficient to determine color conversion results even after reduction can be thumbnail-output.

And it is another object of the present invention to provide an image processing apparatus, method, and system for performing thumbnail output in accordance with the colors of objects in an image.

According to the present invention, the foregoing object is attained by providing an image processing apparatus comprising: input means for inputting first image data; spool means for temporarily holding the first image data; color conversion means for performing color conversion processing for the first image data held by the spool means using a plurality of different parameters to generate a plurality of second image data; and output means for changing a size of the plurality of second image data generated by the color conversion means and thumbnail-outputting the second image data, wherein the spool means holds objects in the first image data in accordance with colors of the objects.

With this arrangement, only objects in a predetermined color range can be thumbnail-output.

And it is another object of the present invention to provide an image processing apparatus, method, and system for performing thumbnail output in accordance with the types of objects in an image.

According to the present invention, the foregoing object is attained by providing an image processing apparatus comprising: input means for inputting first image data; spool means for temporarily holding the first image data; color conversion means for performing color conversion processing for the first image data held by the spool means using a plurality of different parameters to generate a plurality of second image data; and output means for changing a size of the plurality of second image data generated by the color conversion means and thumbnail-outputting the second image data, wherein the spool means holds objects in the first image data in accordance with types of the objects.

With this arrangement, only objects of a predetermined type can be thumbnail-output.

And it is another object of the present invention to provide an image processing apparatus, method, and system for performing thumbnail output in accordance with the area in an image.

According to the present invention, the foregoing object is attained by providing an image processing apparatus comprising: input means for inputting first image data; spool means for temporarily holding the first image data; color conversion means for performing color conversion processing for the first image data held by the spool means using a plurality of different parameters to generate a plurality of second image data; and output means for thumbnail-outputting the plurality of second image data generated by the color conversion means, wherein the spool means holds only a predetermined area of the first image data.

With this arrangement, only a predetermined area can be thumbnail-output.

And it is another object of the present invention to provide an image processing apparatus, method, and system for performing thumbnail output for only an object designated in an image.

According to the present invention, the foregoing object is attained by providing an image processing apparatus comprising: input means for inputting first image data; designation input means for inputting a user designation for designating an object in the first image data; color conversion means for performing color conversion processing for the object designated by the user designation using a plurality of parameters to generate a plurality of second image data; and output means for thumbnail-outputting the plurality of second image data generated by the color conversion means.

With this arrangement, only a designated object can be thumbnail-output.

The invention is particularly advantageous since minimum required information in an image can be thumbnail-output in a short time.

In addition, an object to be thumbnail-output can be arbitrarily set to improve the operability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 16A to 16D are views showing examples of processing area setting in the fourth embodiment;

DETAILED DESCRIPTION OF THE PREFERRED EMBODIMENTS

Preferred embodiments of the present invention will now be described in detail in accordance with the accompanying drawings.

First Embodiment

Figure 1:
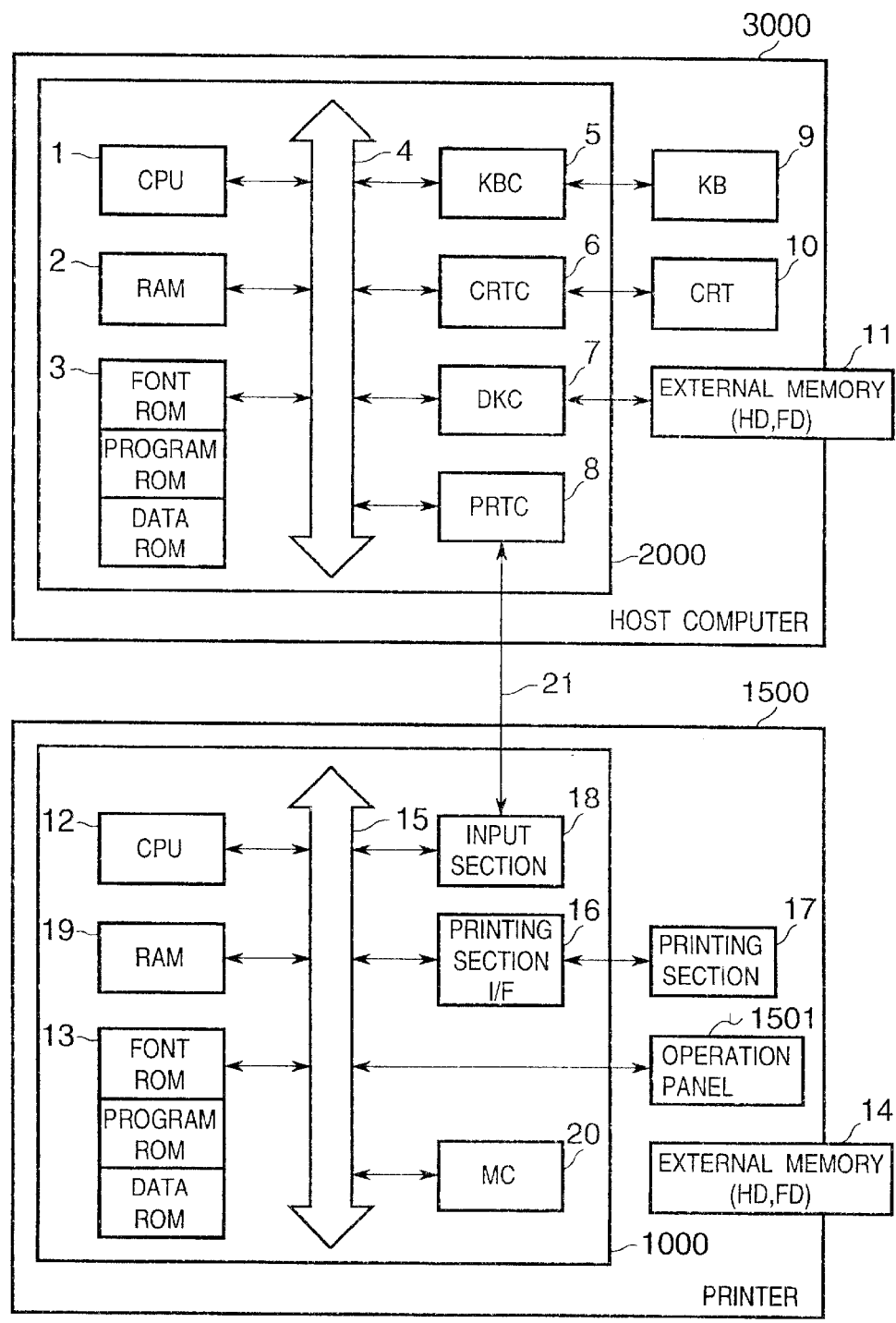
FIG. 1 is a block diagram showing the arrangement of a printer control system according to the first embodiment of the present invention.

FIG. 1 is a block diagram showing the arrangement of a printer control system according to the first embodiment. The present invention is not limited to the arrangement shown in FIG. 1 and can be applied to a single device, a system constructed by a plurality of devices, or a system for performing processing between devices connected through a network such as a LAN or WAN as far as the function of the first embodiment can be executed.

Referring to FIG. 1, a host computer 3000 comprises a CPU 1 which processes documents with graphics, images, characters, tables (including spreadsheets), and the like on the basis of a document processing program stored in a program ROM in a ROM 3 or an external memory 11 such as a hard disk (HD) or floppy disk (FD). Devices connected to a system bus 4 are systematically controlled by the CPU 1. The program ROM in the ROM 3 or the external memory 11 stores an operating system program (to be referred to as an OS hereinafter) as the control program of the CPU 1. A font memory in the ROM 3 or the external memory 11 stores font data used for document processing. A data ROM in the ROM 3 or the external memory 11 stores various data used for document processing. A RAM 2 functions as a main memory or work area of the CPU 1.

A keyboard controller (KBC) 5 controls key input from a keyboard (KB) 9 or pointing device (not shown). A CRT controller (CRTC) 6 controls display of a CRT display (CRT) 10. A disk controller (DKC) 7 controls access to the external memory 11 which stores a boot program, various applications, font data, user files, edit files, printer control command generation program (to be referred to as a printer driver hereinafter), and the like. A printer controller (PRTC) 8 is connected to a printer 1500 through a bi-directional interface (I/F) 21 to control communication with the printer 1500.

The CPU 1 executes bitmapping (rasterization) of outline fonts on, e.g., a display information RAM set on the RAM 2 and guarantees data reproducibility or so-called WYSIWYG on the CRT 10. Additionally, the CPU 1 opens various registered windows and executes various data processing operations on the basis of commands pointed by a mouse cursor (not shown) on the CRT 10. Before printing, a user can open a window associated with print setting to set the printer or printing method for the printer driver, including print mode selection.

The printer 1500 is controlled by an internal CPU 12. The CPU 12 outputs image information as output information to a printing section (printer engine) 17 connected to a system bus 15 on the basis of a control program stored in a program ROM in a ROM 13 or an external memory 14 such as a hard disk (HD) or floppy disk (FD). The program ROM in the ROM 13 stores the control program of the CPU 12. A font program in the ROM 13 stores font data used to generate output information. A data ROM stores information used on the host computer 3000 when, e.g., the external memory 14 is not prepared.

The CPU 12 can communicate with the host computer 3000 through an input section 18 to notify the host computer 3000 of information in the printer 1500. A RAM 19 functions as the main memory or work area of the CPU 12. The memory capacity can be increased using an optional RAM connected to an extension port (not shown). The RAM 19 is used as an output information rasterize area, ambient data storage area, or NVRAM. Access to the above-described external memory 14 such as an HD, FD, or IC card is controlled by a memory controller (MC) 20. The external memory 14 is connected as an option so as to store font data, emulation program, and form data. An operation panel 1501 has switches and LED indicators for printer operation.

A plurality of external memories 14 may be prepared. With this arrangement, a plurality of external memories or optional cards which store programs for interpreting printer control languages for different language systems in addition to internal fonts can be connected. In addition, an NVRAM (not shown) may be prepared to store printer mode setting information from the operation panel 1501.

Figure 2:
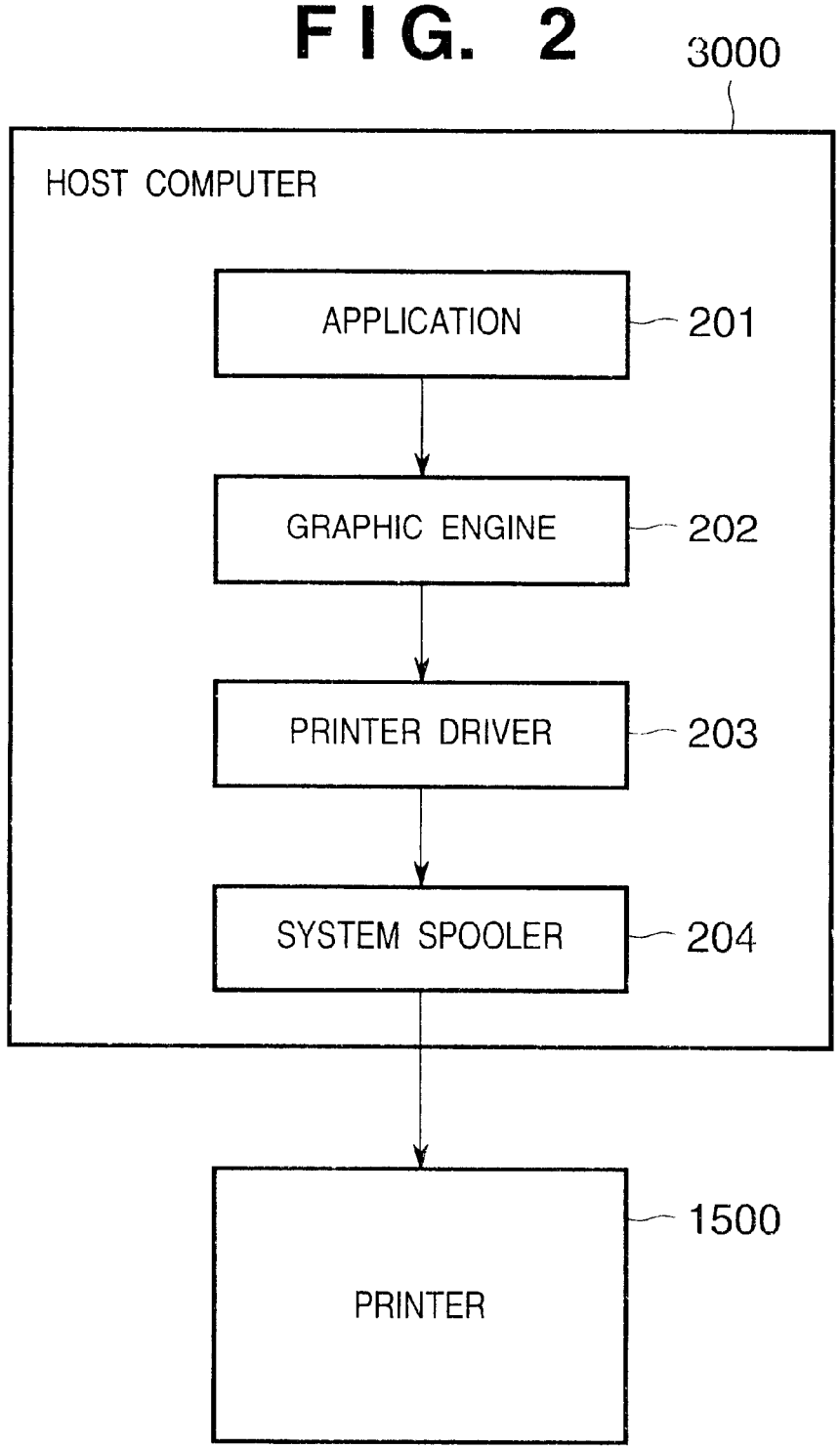
FIG. 2 is a block diagram showing the basic functional arrangement of a host computer of the first embodiment.

FIG. 2 is a block diagram showing the necessary and minimum functional arrangement for printing in the host computer 3000 to which a printer apparatus such as the printer 1500 is connected directly or via a network. An application 201, graphic engine 202, printer driver 203, and system spooler 204 are program modules that exist as files stored in the external memory 11 and are loaded to the RAM 2 and executed by the OS or a module using it. The application 201 and printer driver 203 can be added to an FD as the external memory 11, CD-ROM (not shown), or a HD as an external device through a network.

The application 201 stored in the external memory 11 is loaded to the RAM 2 and executed. In printing by the printer 1500 from the application 201, the graphic engine 202 which is also loaded to the RAM 2 to be executable is used to output (draw) an image. The graphic engine 202 also loads the printer driver 203 prepared in units of printing apparatuses (in this embodiment, for the printer 1500) from the external memory 11 to the RAM 2. The output from the application 201 is converted into a control command for the printer 1500 using the printer driver 203. The converted printer control command is output to the printer 1500 through the system spooler 204 loaded to the RAM 2 by the OS, and I/F 21.

Figure 3:
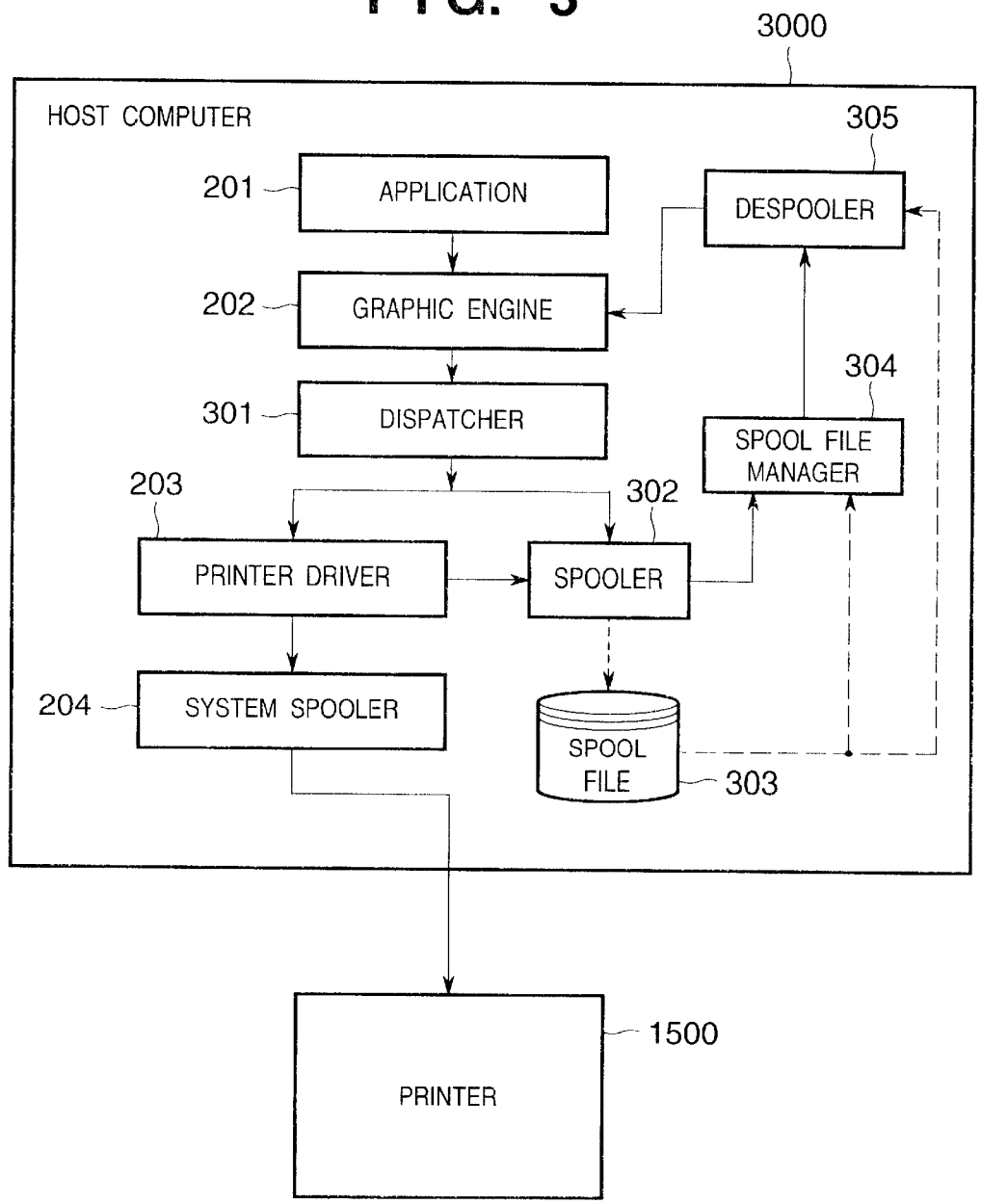
FIG. 3 is a block diagram showing the detailed functional arrangement of the host computer of the first embodiment.

The printing system of this embodiment has, in addition to the minimum arrangement-constructed by the printer 1500 and host computer 3000 shown in FIG. 2, an arrangement shown in FIG. 3 in which print data from an application is temporarily spooled by intermediate code data. More specifically, FIG. 3 shows an extended arrangement of the system shown in FIG. 2. As a characteristic feature of this arrangement, when a print instruction is sent from the graphic engine 202 to the printer driver 203, a spool file 303 formed from an intermediate code is temporarily generated.

In the system shown in FIG. 2, the application 201 is relieved from printing after all print instructions from the graphic engine 202 are converted into printer control commands by the printer driver 203. To the contrary, in the system shown in FIG. 3, the application 201 is relieved when all print instructions are converted into intermediate codes by a spooler 302 and output to the spool file 303. Normally, the time required until the application 201 is relieved is shorter in the latter system. In addition, in the system shown in FIG. 3, contents stored in the spool file 303 can be arbitrarily processed. This arrangement can realize functions that are not prepared in the application 201: a plurality of pages of print data from the application 201 can be reduced and printed on one page to allow so-called thumbnail printing. To process print data, normally, predetermined setting is done on a window provided by the printer driver 203, and the printer driver 203 stores the set contents in the RAM 2 or external memory 11.

The system shown in FIG. 3 will be described below in detail. Referring to FIG. 3, a print instruction from the graphic engine 202 is received by a dispatcher 301. When the print instruction received from the graphic engine 202 by the dispatcher 301 is a print instruction issued from the application 201 to the graphic engine 202, the dispatcher 301 loads the spooler 302 stored in the external memory 11 to the RAM 2 and sends the print instruction not to the printer driver 203 but to the spooler 302.

The spooler 302 converts the received print instruction into an intermediate code and outputs it to the spool file 303. The spooler 302 also acquires process setting associated with print data, which is set in the printer driver 203, from the printer driver 203 and stores it in the spool file 303. The spool file 303 is generated as a file on the external memory 11. However, the spool file 303 may be generated on the RAM 2.

The spooler 302 loads a spool file manager 304 stored in the external memory 11 to the RAM 2 and notifies the spool file manager 304 of the generation situation of the spool file 303. After this, the spool file manager 304 determines whether printing can be performed, on the basis of the contents of process setting associated with the print data, which is stored in the spool file 303.

When the spool file manager 304 determines that printing can be performed using the graphic engine 202, a despooler 305 stored in the external memory 11 is loaded to the RAM 2 and instructed to perform print processing of the intermediate code compiled in the spool file 303. The despooler 305 processes the intermediate code contained in the spool file 303 in accordance with the contents of process setting held in the spool file 303 and outputs the intermediate code again through the graphic engine 202.

When the print instruction received from the graphic engine 202 by the dispatcher 301 is a print instruction issued from the despooler 305 to the graphic engine 202, the dispatcher 301 sends the print instruction not to the spooler 302 but to the printer driver 203. The printer driver 203 generates a printer control command in accordance with the print instruction. The printer control command is output to the printer 1500 through the system spooler 204.

Figure 4:
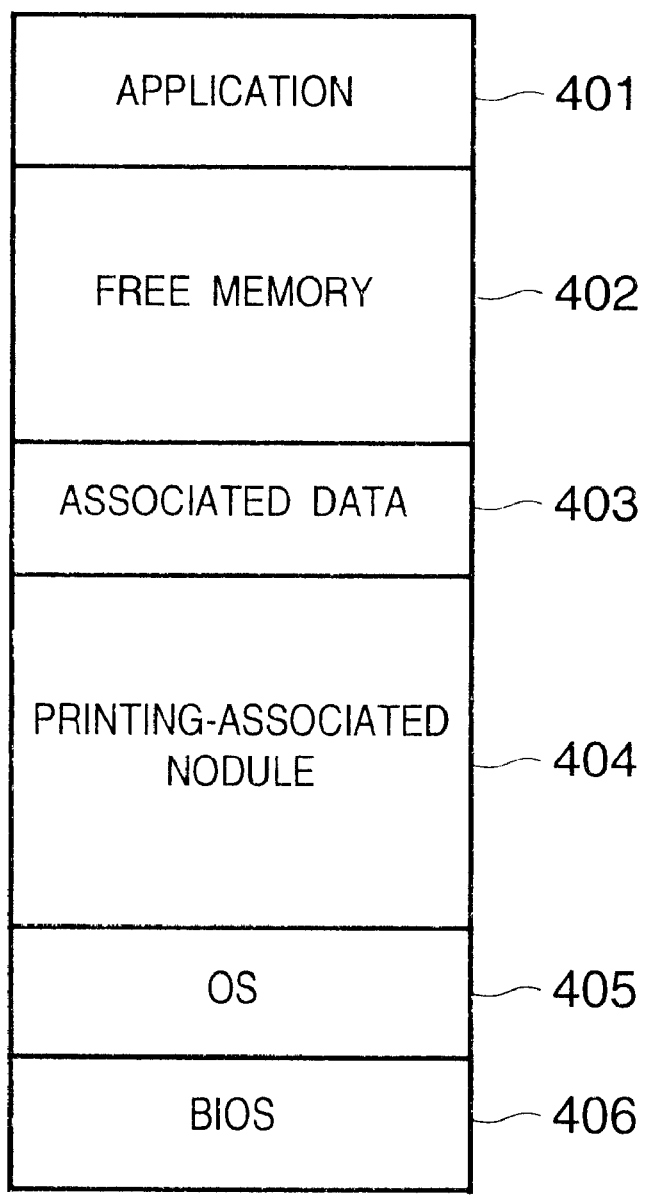
FIG. 4 is a view showing an example of memory map in a RAM of the first embodiment.

FIG. 4 shows an example of memory map when modules related to printing, including the thumbnail printing program of the first embodiment, are loaded to the RAM 2 of the host computer 3000 to be executable.

Color conversion thumbnail printing of the first embodiment will be described below.

Thumbnail printing of the first embodiment means processing of color-converting one original image in accordance with a plurality of different color conversion parameters and thumbnail-printing the color conversion results on printing paper of one page. This will be particularly color conversion thumbnail printing hereinafter.

Figure 5:
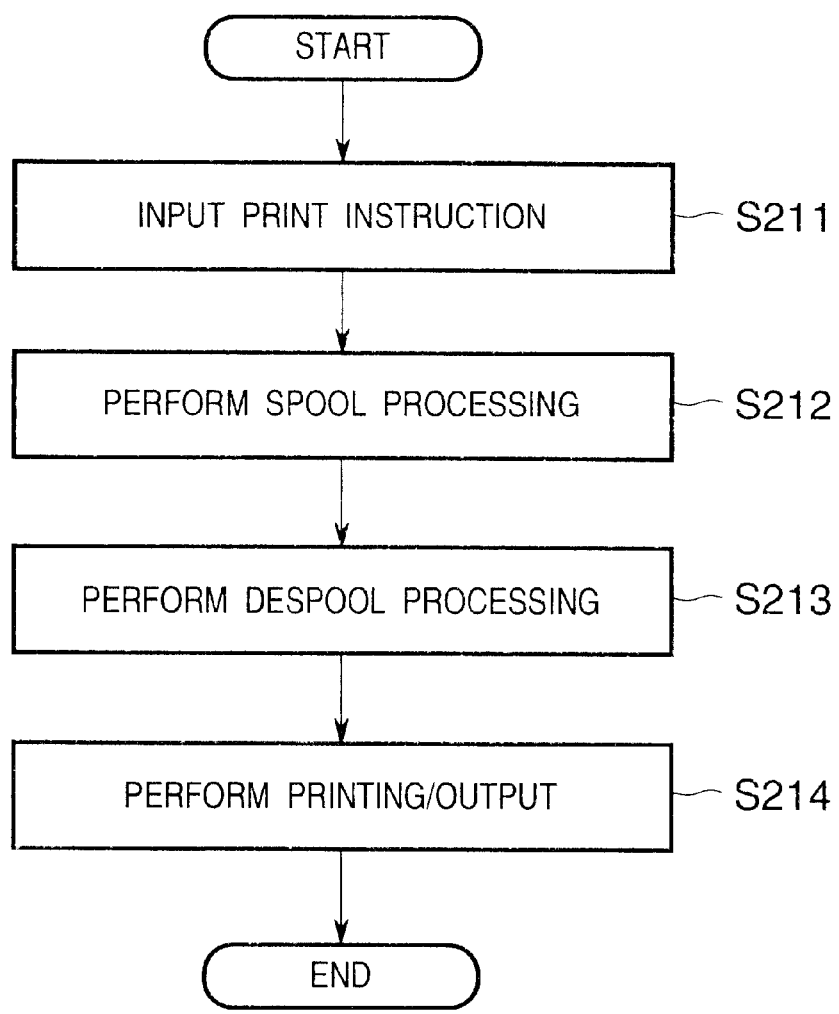
FIG. 5 is a flow chart showing color conversion thumbnail printing in the first embodiment.

FIG. 5 is a flow chart showing color conversion thumbnail printing in the first embodiment. First, in step S211, the graphic engine 202 receives a print instruction issued from the application 201. In step S212, the dispatcher 301 sends the print instruction to the spooler 302, and the spooler 302 performs spool processing of storing the print instruction in the spool file 303 in the form of an intermediate code. The spooler 302 also acquires process setting for the print instruction from the printer driver 203 and stores it in the spool file 303.

In the first embodiment, in this spool processing, instead of storing the entire image data to be printed in accordance with the print instruction in the spool file 303, the image data is only partially stored as an intermediate code. Details of spool processing will be described later.

In step S213, the despooler 305 performs despool processing, i.e., processes the intermediate code as part of the print instruction held in the spool file 303 in accordance with the contents of process setting held in the spool file 303. As a characteristic feature of this embodiment, in this despool processing, color conversion based on a plurality of parameters is performed, and the results are thumbnail-output. Details of despool processing will be described later.

Figure 6:
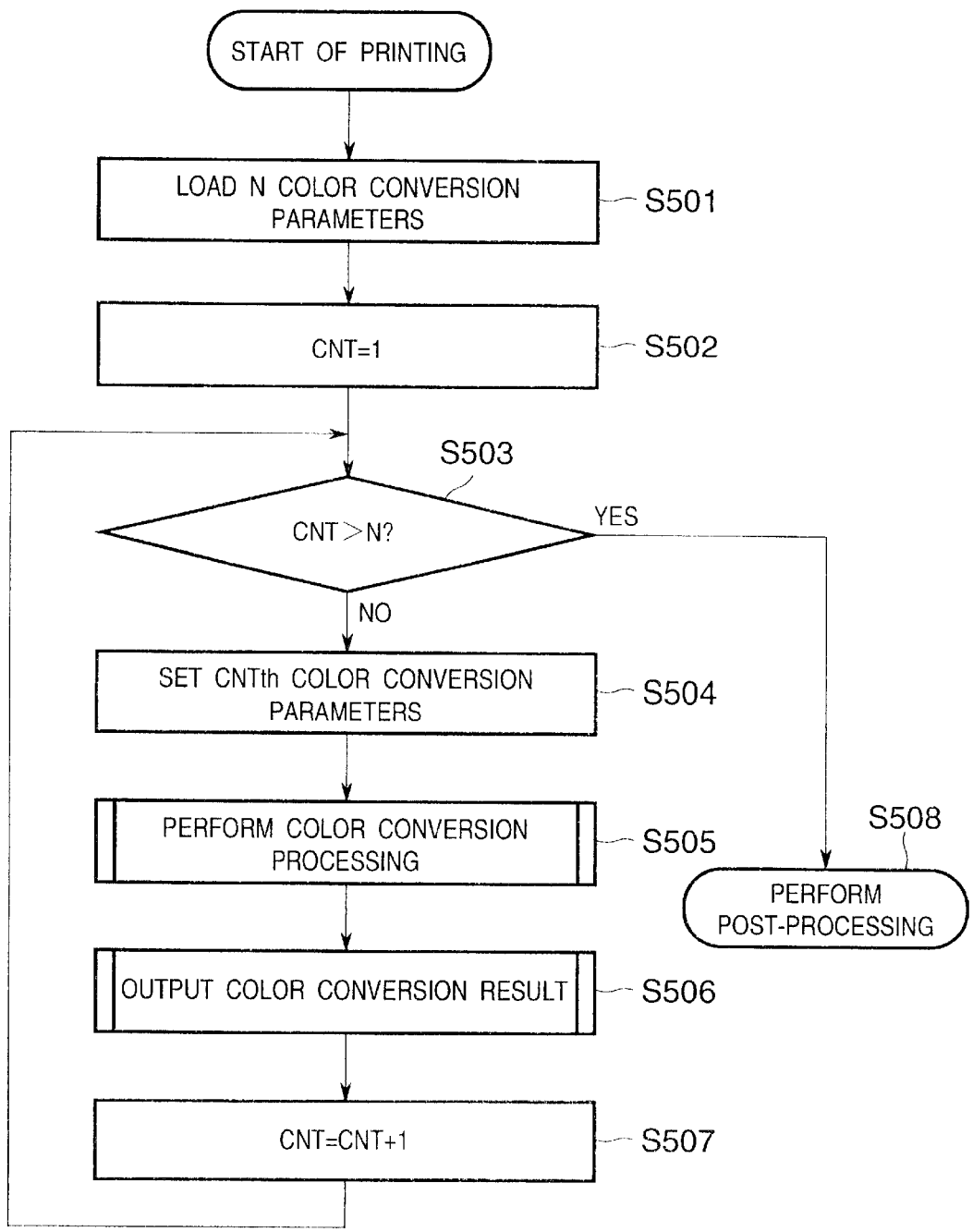
FIG. 6 is a flow chart showing despool processing and print/output processing in the first embodiment.

In step S214, the processed print instruction is output to the printer driver 203 through the graphic engine 202, converted into a printer control command, and output to the printer 1500. FIG. 6 is a flow chart showing despool processing and print/output processing shown in steps S213 and S214 of FIG. 5. As described above, these processing operations are executed by the despooler 305 or printer driver 203.

In step S501, color conversion parameters of N patterns, which are designated by the user through a user interface such as the KB 9, are acquired. In step S502, a counter CNT for managing the number of processed patterns is initialized to 1. In step S503, the counter CNT is checked to determine whether N patterns of color conversion are ended. If YES in step S503, the flow advances to step S508 to perform post-processing including actual printing on a printing paper sheet, and color conversion thumbnail printing is ended.

If unconverted patterns remain in step S503, the CNTth color conversion parameter is set in a color conversion routine in step S504. In step S505, color conversion for image data as an intermediate code held in the spool file 303 is performed using the color conversion parameter.

In step S506, the color conversion result in step S505 is output to the graphic engine 202. In this output processing, images are arranged in a page in accordance with a predetermined layout for thumbnail output of the images on the basis of the data color-converted in step S505. This processing is executed when the despooler 305 stores the intermediate code in the graphic engine 202, or the printer driver 203 replaces the intermediate code with a printer control command.

Figure 7:
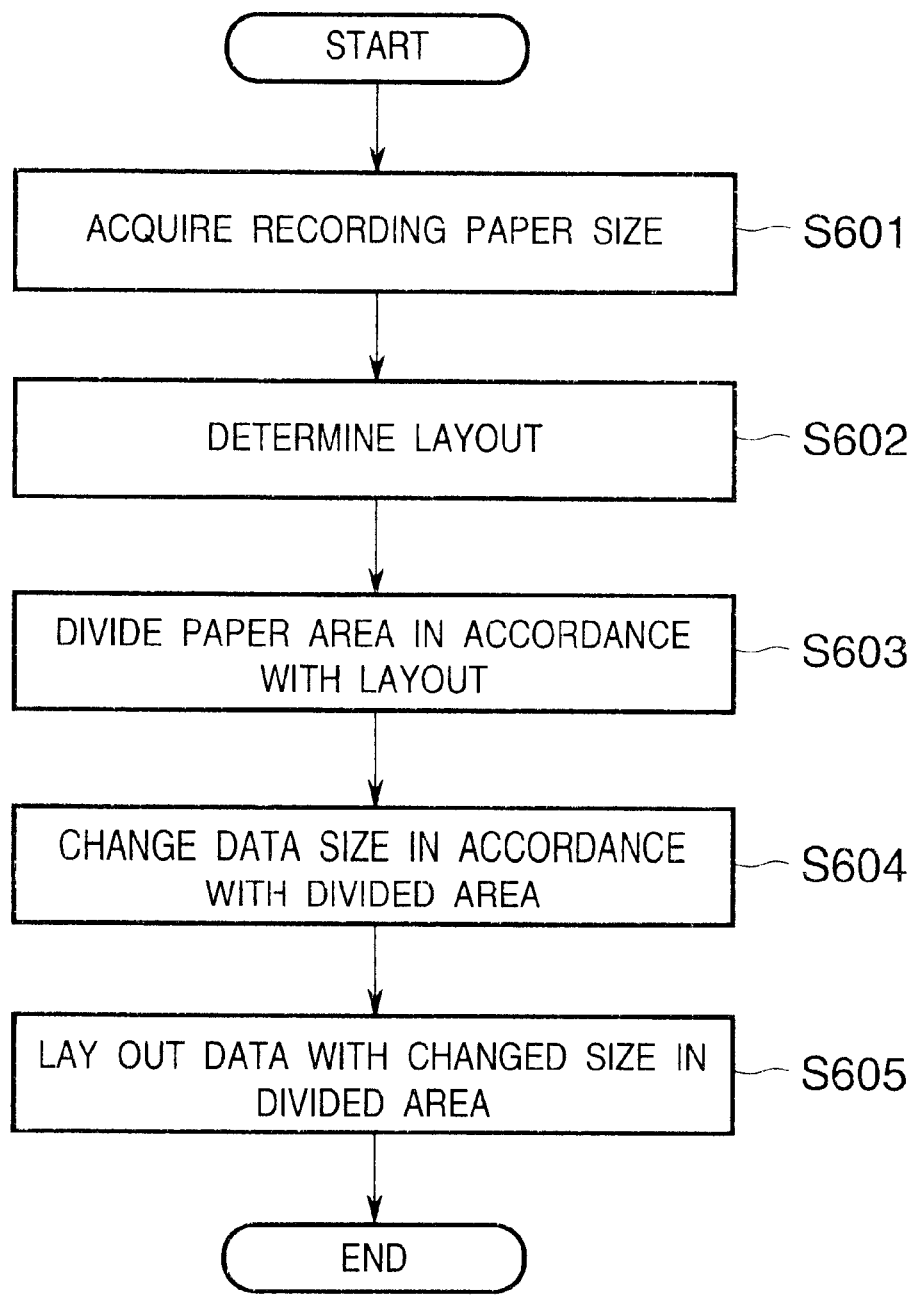
FIG. 7 is a flow chart showing details of thumbnail output processing in the first embodiment.

In step S507, the counter CNT is incremented by one. The flow returns to step S503 to determine whether processing is ended. The above-described color conversion result output processing in step S506, i.e., thumbnail output processing of outputting color conversion results of N patterns onto one print paper sheet will be described below in detail with reference to the flow chart of FIG. 7.

In step S601, the paper size is acquired. In step S602, the output layout is determined on the basis of the paper size and the number N of color conversion patterns. In step S603, the output size is determined in units of color conversion patterns on the basis of the output layout, and the paper sheet area is divided. Processing in steps S601 to S603 is performed by the despooler 305 or printer driver 203 before color conversion result output processing in step S506 of FIG. 6 is actually started.

As actual output processing, in step S604, the size of image data color-converted in step S505 is reduced in accordance with the output size on the layout. In step S605, the image data with the changed size is arranged on the paper sheet on the basis of the layout. With this processing, image data color-converted in accordance with N patterns are formed on one print paper sheet. That is, color conversion thumbnail printing can be performed.

As a characteristic feature of color conversion thumbnail printing of this embodiment, of a plurality of objects constructing an original image, only objects which allow sufficient color conversion result confirmation even after reduction and conversion are printed.

Figure 8:
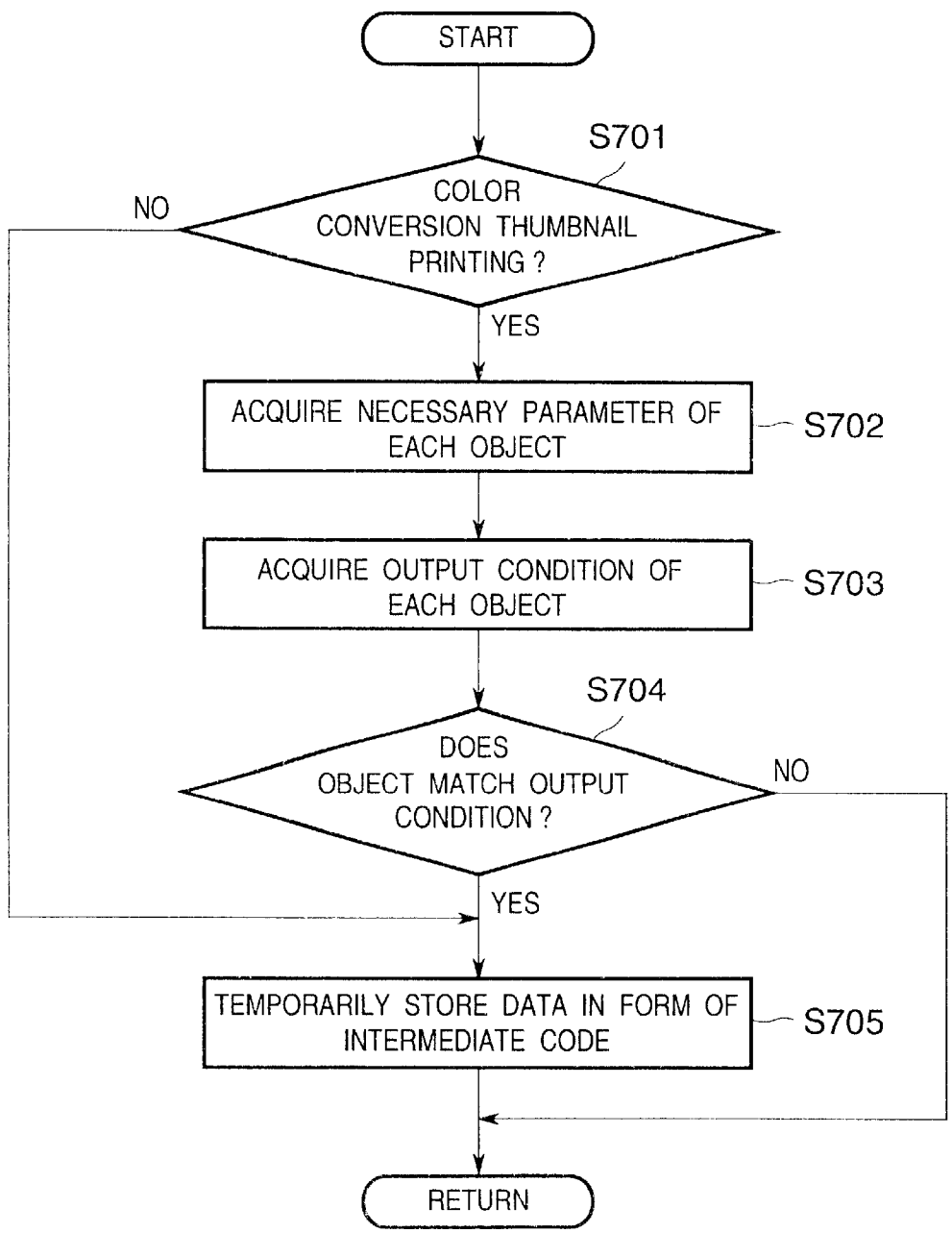
FIG. 8 is a flow chart showing spool processing in the first embodiment.
Figure 10A:
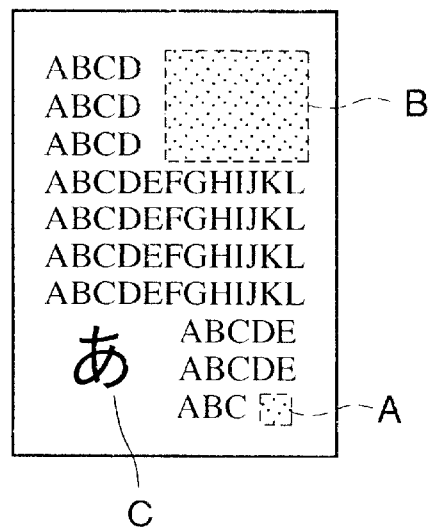
FIGS. 10A to 10C are views showing examples of thumbnail printing in the first embodiment.

FIG. 8 is a flow chart showing spool processing in step S212 of FIG. 5. An example in which an original image shown in FIG. 10A is subjected to color conversion thumbnail printing of this embodiment will be described. As described above, spool processing of this embodiment is processing executed when the dispatcher 301 receives, from the graphic engine 202, a print instruction issued from the application 201, and sends the print instruction to the spooler 302, i.e., processing of storing image data to be printed in the spool file 303 by the spooler 302.

In step S701, it is determined whether the received print instruction is a color conversion thumbnail printing instruction. If NO in step S701, the flow advances to step S705 to temporarily store the entire original image to be printed in the form of an intermediate code. The print instruction is determined on the basis of whether thumbnail output is instructed by the user through the user interface such as the KB 9.

If YES in step S701, the flow advances to step S702 to acquire necessary parameters in units of objects in the original image to be printed. This processing is executed to acquire parameters required for comparison with output conditions later and changes depending on the object. In this case, an object of a rectangle A of the original image shown in FIG. 10A will be exemplified. Assume that the size information of the rectangle A, which is calculated from coordinates representing the print range, is acquired.

In step S703, the output condition of an object for which print/output must be permitted is acquired. In the first embodiment, this "output condition" defines an "object whose color difference can be recognized even after reduction output".

In step S704, it is determined whether each object matches the output condition. More specifically, it is determined on the basis of the size information of the rectangle A whether the rectangle A is an "object whose color difference can be recognized even after reduction output". Details will be described later.

Only when the object matches the output condition, the object is temporarily stored in the spool file 303 in the form of an intermediate code in step S705. Objects that do not match the output condition are not stored. More specifically, when the rectangle A is an "object whose color difference can be recognized even after reduction output", it is stored (spooled). However, if the rectangle A is an "object whose color difference cannot be recognized after reduction", it is not spooled. As described earlier, in color conversion thumbnail printing of this embodiment, only objects which match a predetermined output condition are printed, and object which do not match the output condition are not printed.

Figure 9:
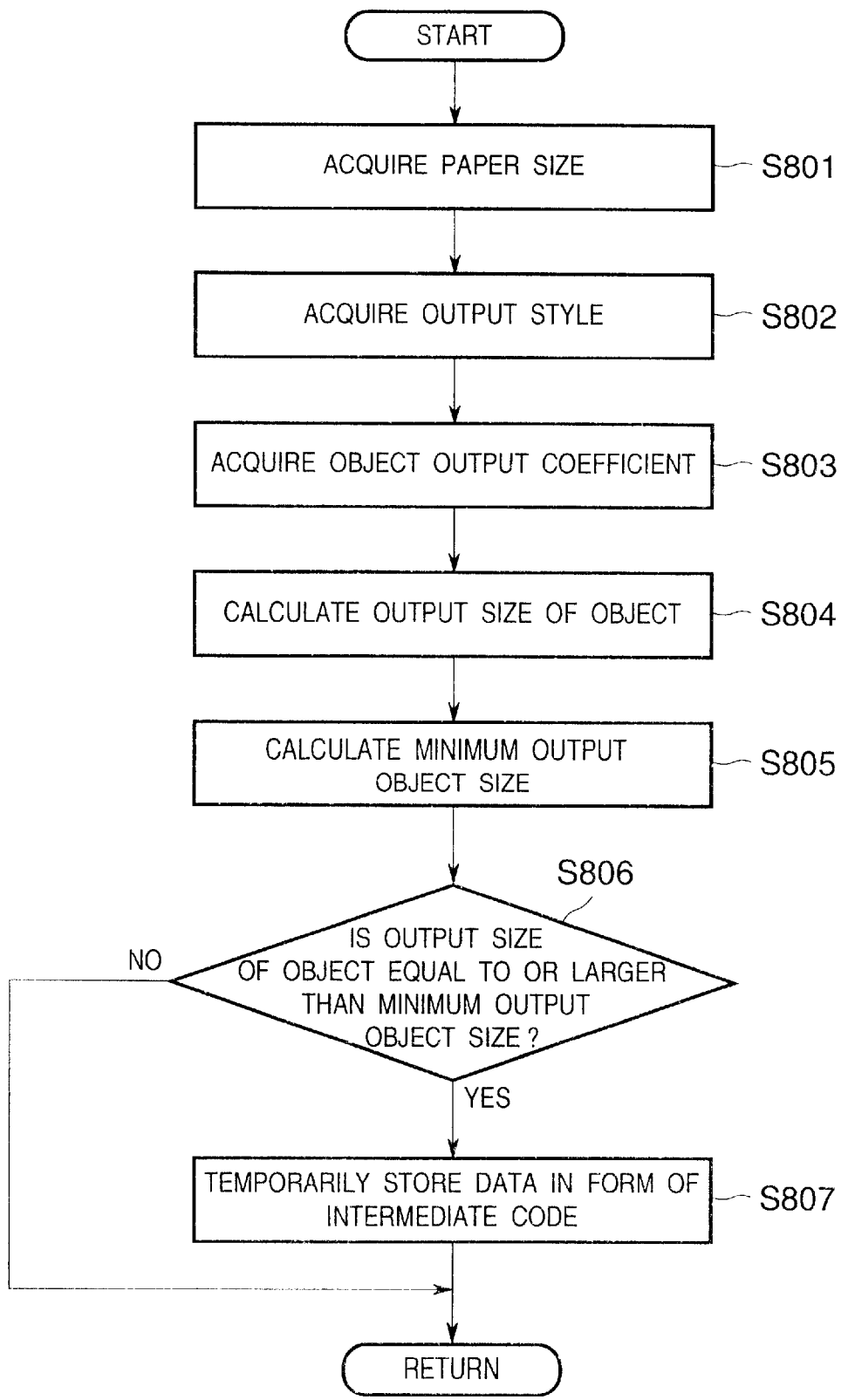
FIG. 9 is a flow chart showing details of spool processing in the first embodiment.

FIG. 9 is a flow chart showing details of spool processing of the first embodiment when the object output condition is "object whose color difference can be recognized even after reduction output", and this will be described below. Processing shown in FIG. 9 corresponds to steps S702 to S705 in FIG. 8.

In steps S801 and S802, the size of a print paper sheet to be actually printed and output style are acquired. The output style means the number of types of color conversion to be performed for one logic page of the original image, i.e., the number of types of processing results to be printed in one physical page. In accordance with this, the actual output size of each logic page can be known.

In step S803, an object output coefficient is acquired. The object output coefficient is a coefficient for each object, which defines the allowable output size of an object. The object output coefficient acquired in step S803 is used to calculate the minimum output object size later.

In step S804, the actual object output size is calculated. That is, the actual size of an object (e.g., rectangle A) expressed on one logic page is calculated. More specifically, first, the reduction magnification is calculated from the acquired print paper size and output style. On the basis of the reduction magnification, the output size of an object (rectangle A) is obtained. The above-described steps S801 to S805 correspond to necessary parameter acquisition processing shown in step S702 of FIG. 8.

In step S805, on the basis of the acquired object output coefficient, the allowable minimum size (minimum output object size) of the object is calculated. This processing corresponds to object output condition acquisition processing shown in step S703 of FIG. 8.

In step S806, it is determined whether the object output size calculated in step S804 is equal to or larger than the minimum output object size calculated in step S805. This processing corresponds to output determination processing instep S704 of FIG. 8. If YES instep S806, i.e., if the object satisfies the output condition, the object is temporarily stored in the form of an intermediate code in step S807. On the other hand, if NO in step S806, the object does not match the output condition, so spool processing is not performed. Hence, printing by despool is not performed for the object.

Figure 10B:
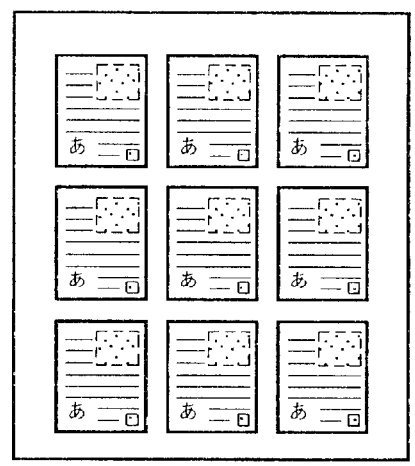

FIG. 10B shows an example in which the original image shown in FIG. 10A is color-converted using nine color conversion parameters, and normal thumbnail printing is performed for the color conversion results. As is apparent from FIG. 10B, nine reduced images of the original image are printed on one print paper sheet.

Figure 10C:
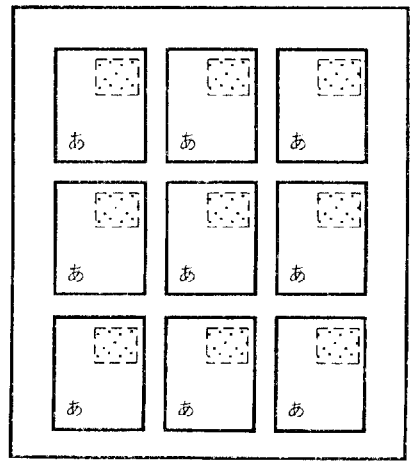

FIG. 10C shows a result obtained by performing, for the same color conversion results, thumbnail printing of the first embodiment in which output objects are limited. As is apparent from FIG. 10C, the rectangle A is not printed because it is smaller than the minimum output object size, and the remaining font objects are not printed, either. Since an object represented by a rectangle B and a Japanese font object C have sizes larger than the minimum output object size even after reduction, i.e., the objects satisfy the output condition, only the rectangle B and Japanese font C are printed.

As described above, according to the first embodiment, only objects whose color conversion results can be sufficiently determined even after reduction are thumbnail-printed, so only necessary and sufficient information can be printed in a short time.

In this embodiment, when the object output coefficient is changed, the minimum output object size of each object can be changed. The object output coefficient may also be arbitrarily changed by the user. With this arrangement, only objects with sizes desired by the user can be thumbnail-output.

Second Embodiment

The second embodiment of the present invention will be described below.

In the above-described first embodiment, a case wherein the object output condition is "object whose color difference can be recognized even after reduction output" has been described. However, the object output condition of the present invention is not limited to this. In the second embodiment, an example in which the object output condition can be set within an arbitrary color range by a user will be described. That is, only objects falling within the color range designated by the user are thumbnail-printed. In the second embodiment, the image processing system arrangement and color conversion thumbnail printing, including spool processing shown in FIG. 8, are the same as in the above-described first embodiment, and a detailed description thereof will be omitted.

Figure 11:
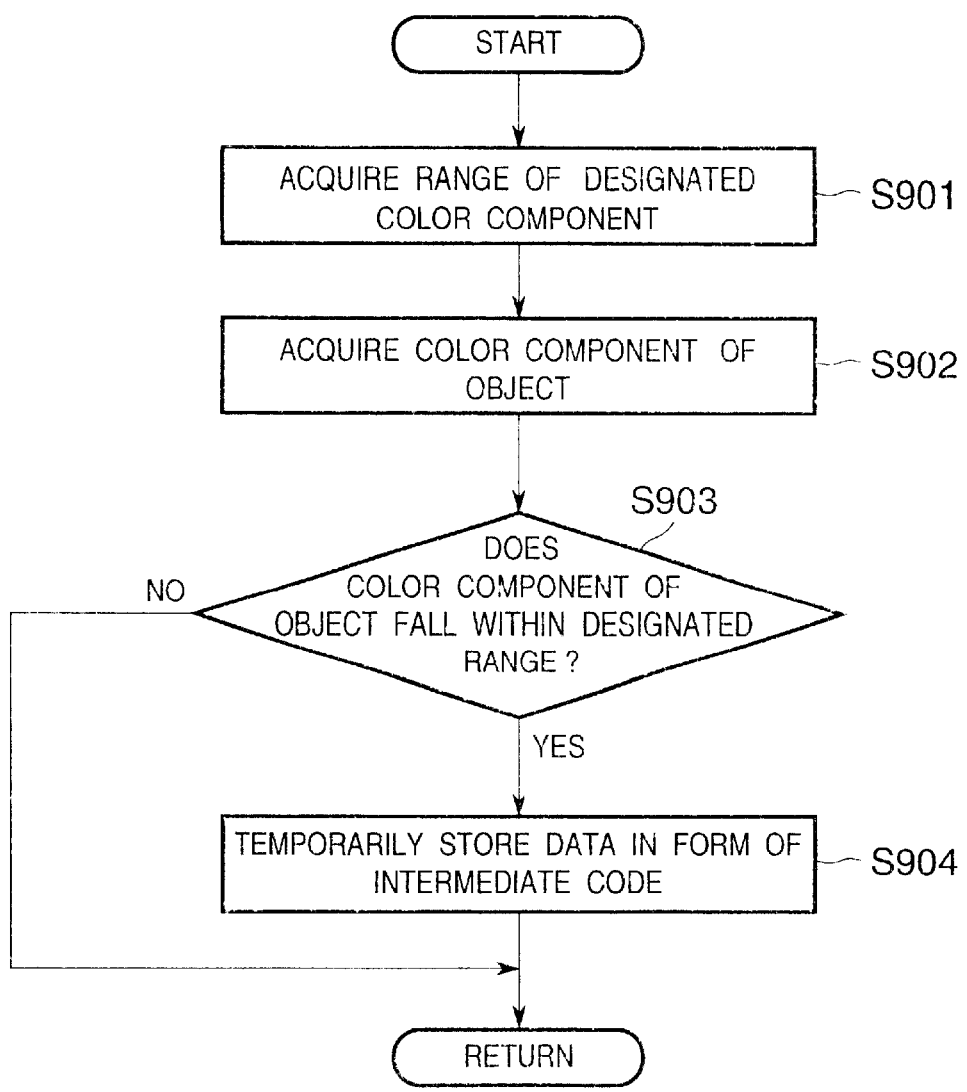
FIG. 11 is a flow chart showing details of spool processing according to the second embodiment of the present invention.

FIG. 11 is a flow chart showing details of spool processing according to the second embodiment, and this will be described below. As described above, in the second embodiment, color conversion thumbnail printing is performed while setting "designated color range" as the object output condition. In the second embodiment, before the start of processing shown in FIG. 11, a specific "color" is selected by the user through a user interface such as a KB 9 of a host computer 3000, and color components corresponding to the selected "color" and their ranges are set in a spooler 302. The color range setting method is not particularly limited.

First, in step S901 of FIG. 11, the ranges of designated color components are acquired. For example, on the basis of the "color" selected by the user, the ranges of corresponding color components are acquired as, e.g., (R, G, B)=(0 to 128, 0, 0). These color ranges are obtained by holding them on a table in advance in the spooler 302, though they can be arbitrarily set by changing these values. Next, in step S902, the color components of an object are acquired. With this processing, the color components of objects constructing an original image are acquired.

In step S903, it is determined whether the color components of each object, which are acquired in step S902, fall within the range designated in step S901, i.e., whether the object has a color appearance intended by the user. If it is determined that the object satisfies the output condition, i.e., falls within the designated color range, the flow advances to step S904 to temporarily store (spool) the object in the form of an intermediate code as an object to be output. If the object does not fall within the color range, i.e., does not have colors designated by the user, spool processing is not performed. That is, this object is not printed by despool processing later.

Figure 12A:
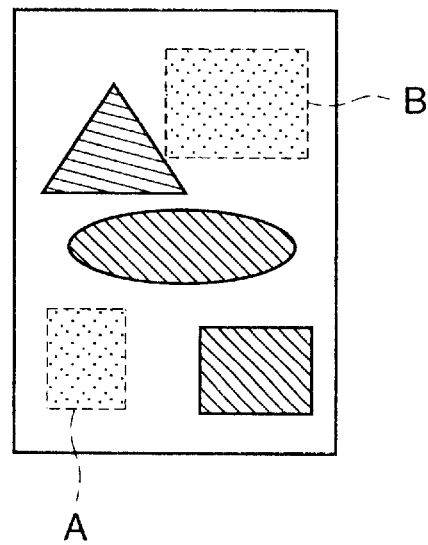
FIGS. 12A to 12C are views showing examples of thumbnail printing in the second embodiment.
Figure 12B:
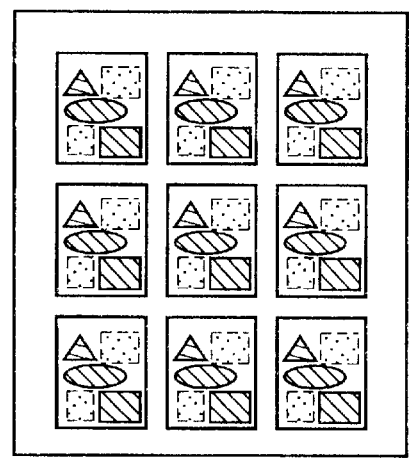

FIG. 12B shows an example in which an original image shown in FIG. 12A is color-converted using nine color conversion parameters, and normal thumbnail printing is performed for the color conversion results. As is apparent from FIG. 12B, nine reduced images of the original image are printed on one print paper sheet.

Figure 12C:
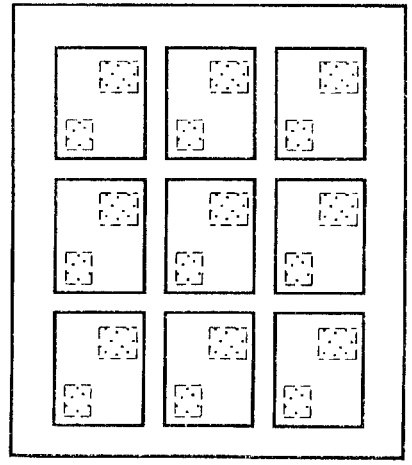

FIG. 12C shows a result obtained by performing, for the same color conversion results, thumbnail printing of the second embodiment in which output objects are limited. As is apparent from FIG. 12C, only rectangles A and B are printed because they have colors falling within the color range designated by the user.

As described above, according to the second embodiment, only objects within the color range based on an instruction by the user are thumbnail-printed, so only necessary and sufficient information can be printed in a short time.

Third Embodiment

The third embodiment of the present invention will be described below.

In color conversion thumbnail printing described above in the first and second embodiments, the object output condition is "object having a size equal to or larger than a predetermined size" or "object within a predetermined color range". However, the object output condition of the present invention is not limited to this. In the third embodiment, an object type is set as the object output condition, and it can be set by a user. That is, only objects of the type designated by the user are thumbnail-printed. In the third embodiment, the image processing system arrangement and color conversion thumbnail printing shown in FIG. 6 are the same as in the above-described first and second embodiments, and a detailed description thereof will be omitted.

Figure 13:
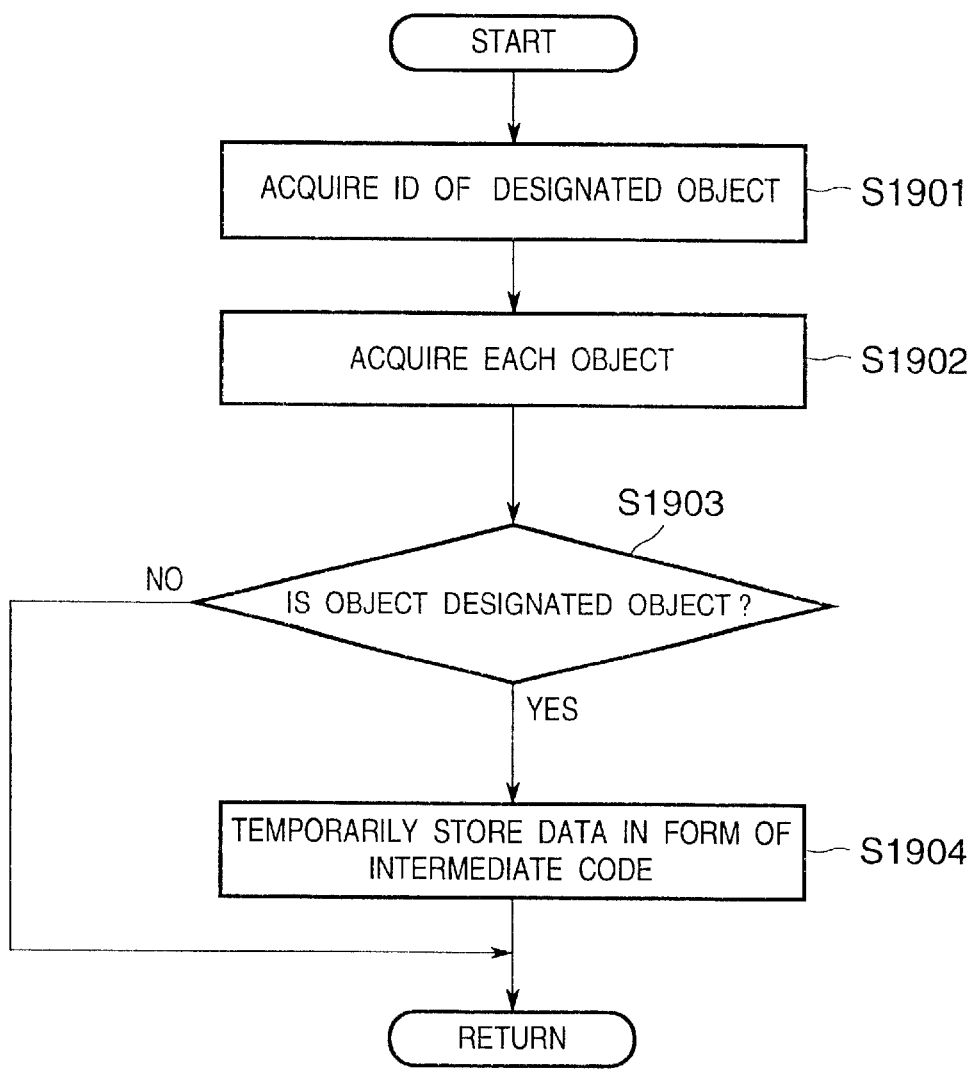
FIG. 13 is a flow chart showing details of spool processing according to the third embodiment of the present invention.

FIG. 13 is a flow chart showing details of spool processing according to the third embodiment, and this will be described below. As described above, in the third embodiment, color conversion thumbnail printing is performed while setting "designated object type" as the object output condition. In the third embodiment, before the start of processing shown in FIG. 13, a specific "object type" is designated or selected by the user through a user interface such as a KB 9 of a host computer 3000, and an object type corresponding to the designated "object type" is set in a spooler 302. The "object type" designation or selection method is not particularly limited. The "object type" means a bitmap object, text object, or graphic object constructing print data.

In step S1901 of FIG. 13, the designated object type is acquired. For example, on the basis of the "object type" designated by the user, object type information such as a corresponding ID is acquired. This can be obtained by holding the information on a table in advance in the spooler 302. In step S1902, all objects in an original image are acquired. With this processing, pieces of object information constructing the original image are acquired.

In step S1903, it is determined whether each object acquired in step S1902 matches the object type designated in step S1901, i.e., the object is an output object intended by the user. If it is determined that the object satisfies the output condition, i.e., the object is the designated object type, the flow advances to step S1904 to temporarily store (spool) the object in the form of an intermediate code as an object to be output. If the object does not match the object type, i.e., the object is no object type designated by the user, spool processing is not performed, and this object is not printed by despool processing later.

Figure 14A:
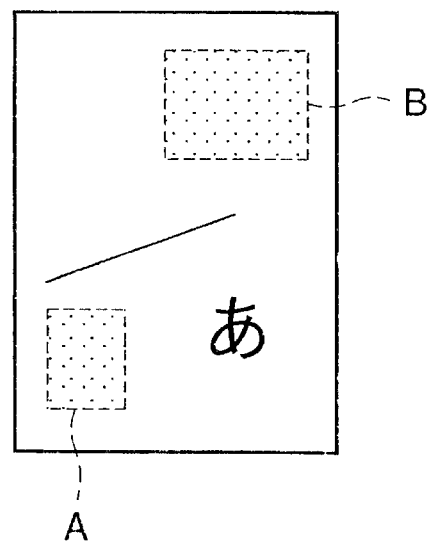
FIGS. 14A to 14C are views showing examples of thumbnail printing in the third embodiment.
Figure 14B:
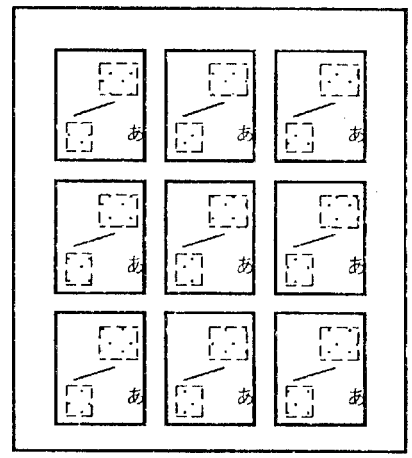

FIG. 14B shows an example in which an original image shown in FIG. 14A is color-converted using nine color conversion parameters, and normal thumbnail printing is performed for the color conversion results. As is apparent from FIG. 14B, nine reduced images of the original image are printed on one print paper sheet.

Figure 14C:
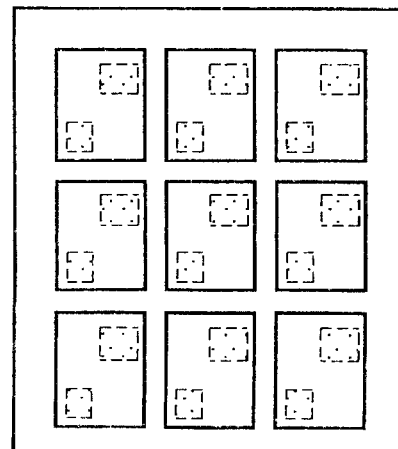

FIG. 14C shows a result obtained by performing, for the same color conversion results, thumbnail printing of the third embodiment in which output objects are limited. As is apparent from FIG. 14C, only rectangles A and B are printed because they match the object type designated by the user.

As described above, according to the third embodiment, only object types based on the designation by the user are thumbnail-printed, so only necessary and sufficient information can be printed in a short time.

Fourth Embodiment

The fourth embodiment of the present invention will be described below.

In color conversion thumbnail printing described in the first to third embodiments, of objects constructing an original image, only objects satisfying a predetermined output condition are output. In the fourth embodiment, only the area in a predetermined range of an original image is subjected to thumbnail output. That is, a specific area is set as an output condition. In the fourth embodiment, the image processing system arrangement and color conversion thumbnail printing shown in FIG. 5 are the same as in the above-described embodiments, and a detailed description thereof will be omitted.

Figure 15:
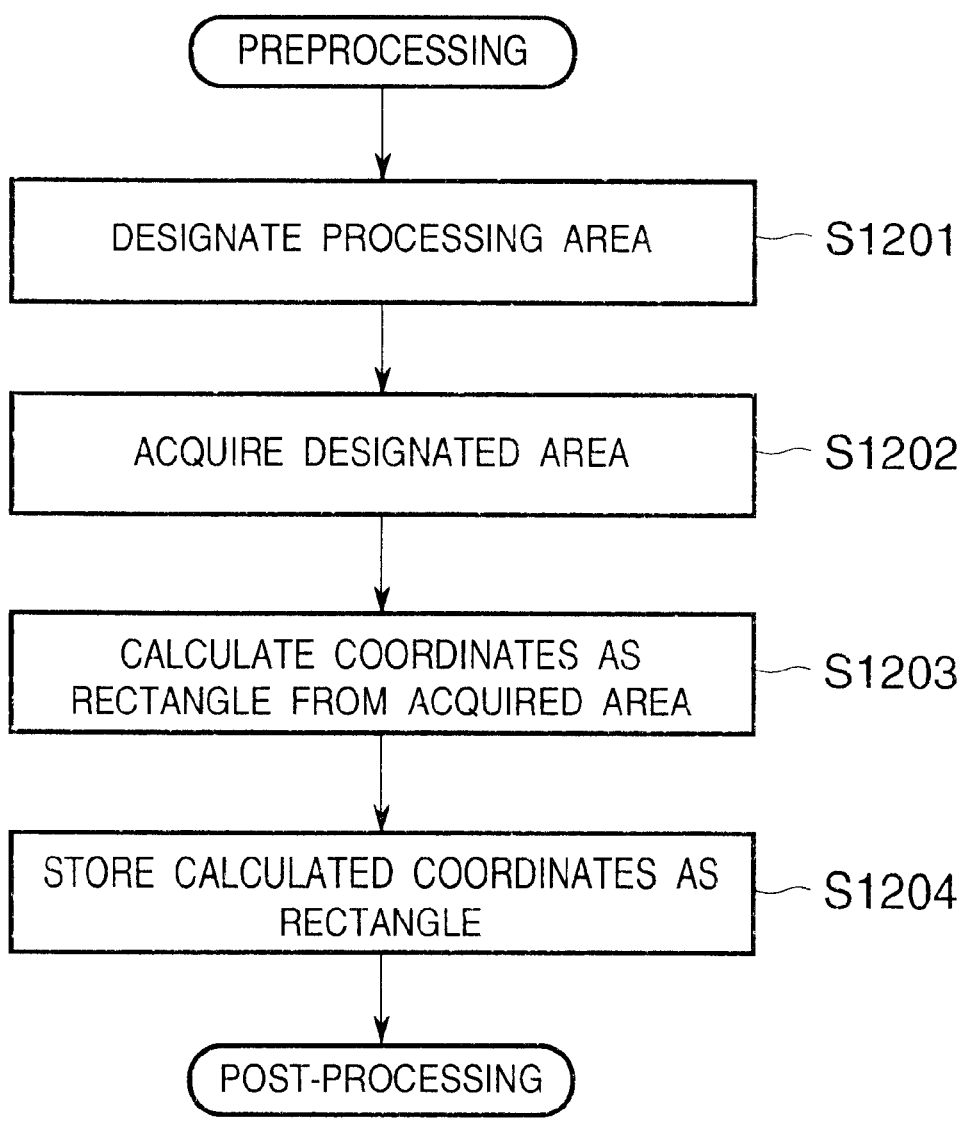
FIG. 15 is a flow chart showing processing area setting processing according to the fourth embodiment of the present invention.

In the fourth embodiment, before the start of color conversion thumbnail printing shown in FIG. 5, an area to be processed in an original image must be set. FIG. 15 is a flow chart showing processing area setting processing, and this will be described below.

First, in step S1201, a processing area is designated by a user through a KB 9 on a window such as a print dialogue box for print setting, which is provided by, e.g., a printer driver 203. FIGS. 16A to 16D show examples of processing area setting. FIGS. 16A and 16B show examples in which one page of the original image is segmented into nine and four areas, respectively. In FIG. 16C, one page of the original image is segmented into nine areas, and a rectangle formed by connecting the central points of areas at the four corners is further segmented into four areas. As is apparent from this, an arbitrary image segmentation method can be used in the fourth embodiment, and the size and layout of an area are not limited. One page segmented in the above manner is displayed on a dialogue box. The user selects an arbitrary segment as a processing area, thereby designating it. A case wherein the image is segmented as shown in FIG. 16C, and a segment A is selected as a processing area will be described below.

In step S1202, the processing area information of the original image, which is set by the user for a spooler 302 through the printer driver 203, is acquired. The processing area information can be acquired as a parameter transferred from the printer driver 203 to the spooler 302 through a dispatcher 301.

Figure 17A:
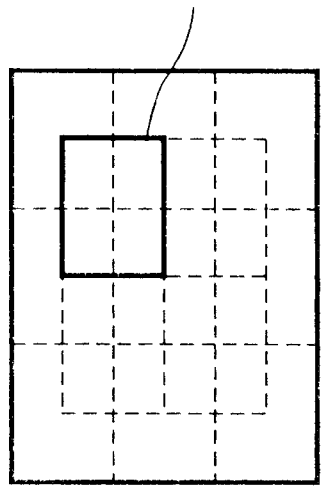
FIGS. 17A and 17B are views for explaining processing area coordinate calculation processing in the fourth embodiment.
Figure 17B:
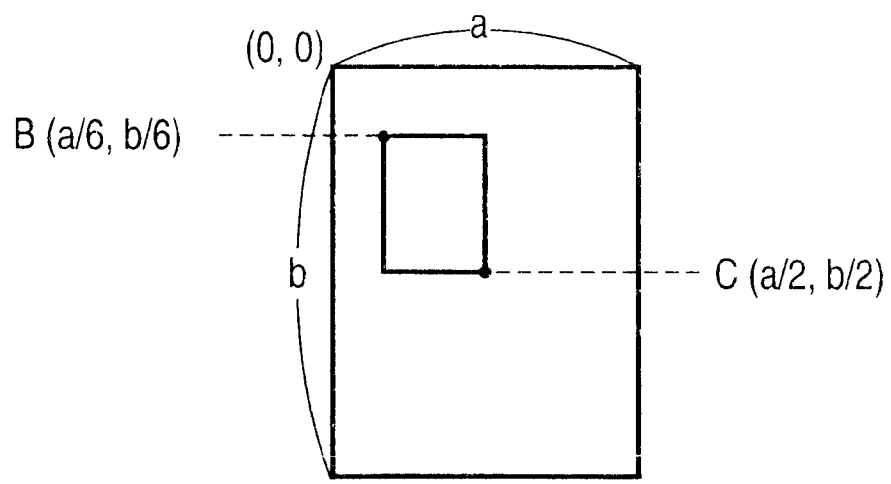

The flow advances to step S1203 to calculate coordinates representing the position of the acquired processing area in the original image. In this processing, the coordinates of the processing area acquired in step S1202 are calculated. Details of this processing will be described with reference to FIGS. 17A and 17B. FIG. 17A shows the segment A as the processing area in the original image. FIG. 17B shows the method of calculating the coordinates of the segment A. Referring to FIG. 17B, let a be the horizontal size of the original image, b be the vertical size, and (0,0) be the coordinates of the upper left point. In this case, the horizontal and vertical sizes of the rectangle A are $a/3$ and $b/3$, respectively. Hence, the coordinates of points B and C of this rectangle A can be represented by $B(a/6, b/6)$ and $C(a/2, b/2)$.

In step S1204, the coordinates calculated in step S1203 are stored. In this processing, data representing the calculated coordinates is stored in a spool file 303, like remaining data necessary for printing. With this processing, data for color conversion thumbnail printing for the set processing area can be provided in reproducing the print data in a despooler 305. Referring to FIG. 15, processing of acquiring the remaining data for printing is performed in preprocessing and post-processing.

The above-described processing in steps S1202 to S1204 is executed by the spooler 302 and started, e.g., when the spooler 302 receives a print instruction from the dispatcher 301. In this case, area information associated with the segment A designated in step S1201 is temporarily stored in a RAM 2 or the like.

After processing area setting processing shown in FIG. 15 is ended, color conversion thumbnail printing shown in FIG. 5 is performed.

Figure 18:
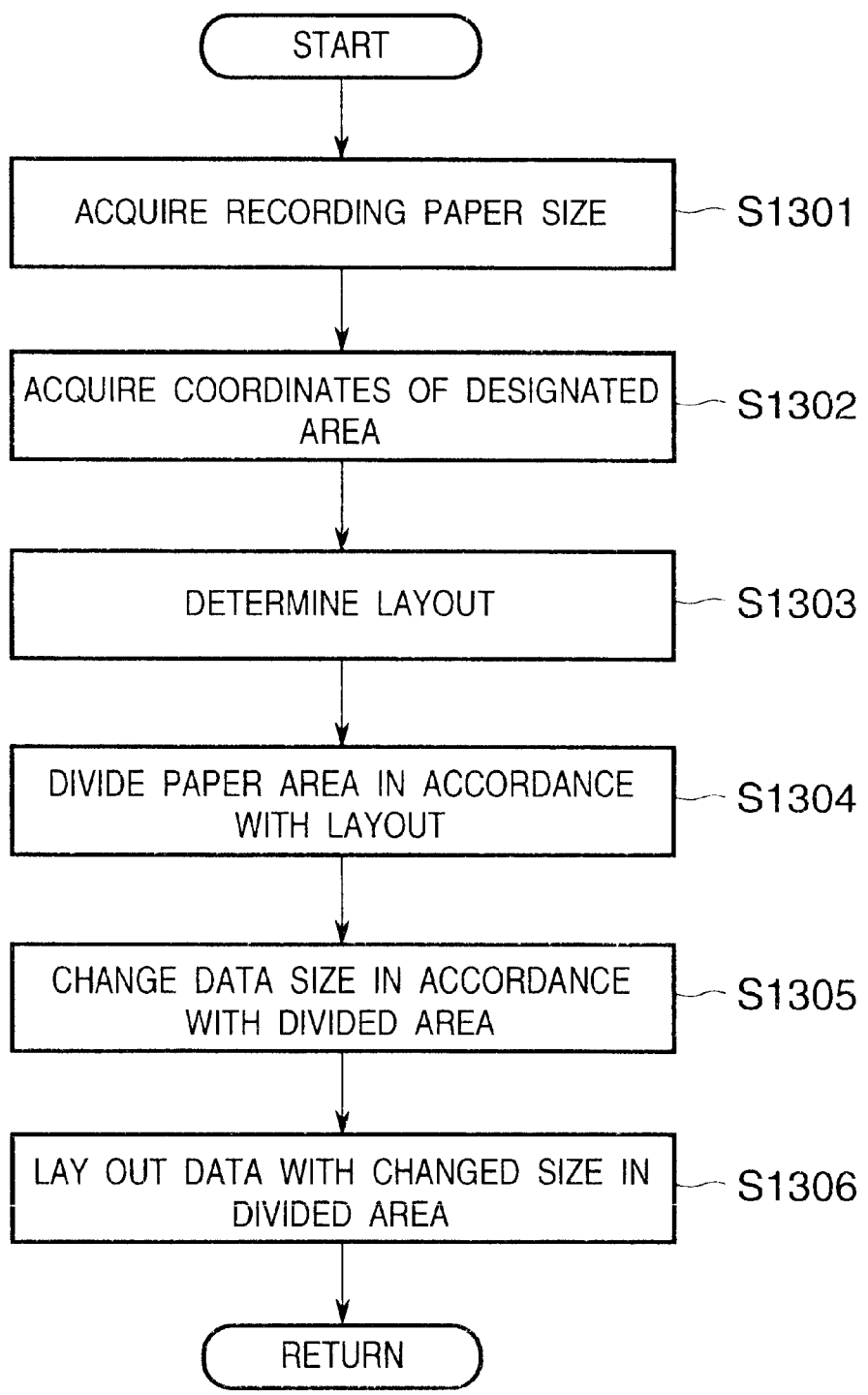
FIG. 18 is a flow chart showing thumbnail output processing in the fourth embodiment.

FIG. 18 is a flow chart showing color conversion result output processing in the fourth embodiment, i.e., thumbnail output processing of outputting only predetermined areas of color conversion results of N patterns on one print paper sheet, and this will be described below. This processing corresponds to step S214 in FIG. 5.

First, in step S1301, the paper size is acquired. In step S1302, the coordinates of a data area to be output are acquired. In this case, the coordinates of the rectangle A, which are calculated by the spooler 302, are acquired. In step S1303, the output layout is determined on the basis of the paper size and the number N of color conversion patterns. In step S1304, the output size is determined in units of color conversion patterns on the basis of the output layout, and the paper sheet area is divided. The above-described processing in steps S1301 to S1304 is performed by a despooler 305 or printer driver 203 before color conversion result printing in step S214 of FIG. 5 is actually started.

Actual output processing is started. First, in step S1305, the data of the area to be output is changed in accordance with the actual output size. In the fourth embodiment, since the area to be output is only the processing area represented by the acquired coordinates, only the processing area in the coordinates is enlarged or reduced in accordance with the output size calculated in step S1304. In step S1306, the image data of the processing area with the changed size is laid out on the paper sheet on the basis of the layout. With this processing, image data of the processing area having the maximum size after color conversion of N patterns are formed on one print paper sheet, i.e., thumbnail printing can be performed.

In the fourth embodiment, images other than the processing area are not output.

Figure 19A:
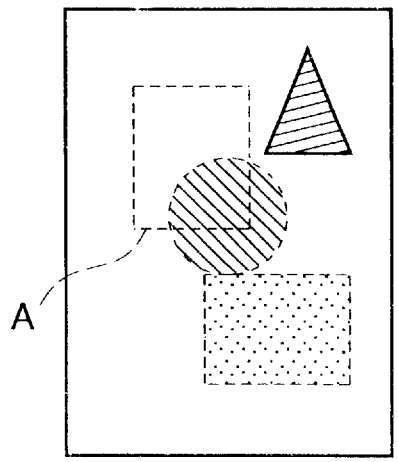
FIGS. 19A to 19C are views showing examples of thumbnail printing in the fourth embodiment.
Figure 19B:
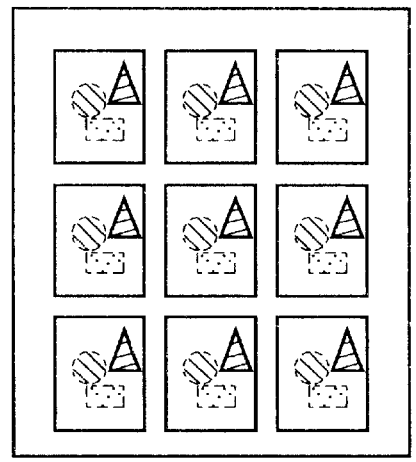

FIG. 19B shows an example in which an original image shown in FIG. 19A is color-converted using nine color conversion parameters, and normal thumbnail printing is performed for the color conversion results. As is apparent from FIG. 19B, nine reduced images of the original image are printed on one print paper sheet.

Figure 19C:
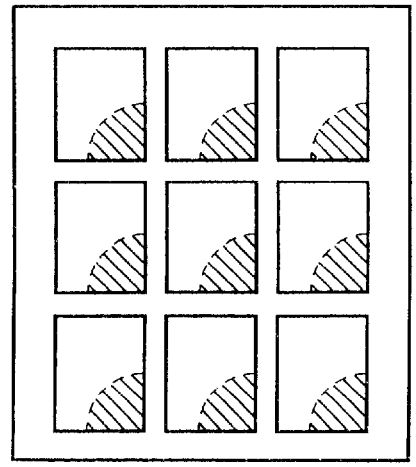

FIG. 19C shows a result obtained by performing, for the same color conversion results, thumbnail printing of the fourth embodiment in which output objects are limited. As is apparent from FIG. 19C, the rectangle A shown in FIG. 19A is the processing area designated by the user, and only image data in the rectangle A is thumbnail-printed. In this case, since each image size in the thumbnail printing result is almost the same as that of the rectangle A of the original image, the user can accurately recognize the color conversion result in the area of the rectangle A.

As described above, according to the fourth embodiment, only an area designated by the user is thumbnail-printed. Since thumbnail output can be performed while minimizing the reduction magnification for the area, i.e., the reduction magnification for printing a plurality of logic pages on one physical page, degradation in output image can be suppressed to a minimum, and the color conversion in that area can be more accurately recognized. In addition, since image data to be processed can be small, output processing at a higher speed is possible. Furthermore, since the thumbnail output processing area can be arbitrarily set by the user, the operability is improved.

Modification of Fourth Embodiment

In the fourth embodiment, the processing area subjected to color conversion thumbnail printing is designated in the original image by the user. Instead of doing this designation from predetermined segments that are prepared in advance, the original image may be displayed on, e.g., a window of the user interface, and the user may designate an arbitrary area on the display using a pointing device such as a mouse.

FIG. 16D shows area designation in this modification. This processing corresponds to step S1201 in FIG. 15. As is apparent from FIG. 16D, in one page of an original image displayed on a print dialogue box, an arbitrary segment is set as the processing area using a pointing device such a mouse.

As in the fourth embodiment, processing area information is acquired in step S1202 of FIG. 15. The processing area information can be acquired as a parameter transferred from the printer driver 203 to the spooler 302 through the dispatcher 301. As the processing area information, the output size calculated from the paper size already designated from the printer driver 203, and coordinates already converted from positions pointed by the pointing device can be acquired. For this reason, coordinate calculation processing in step S1203 can be omitted.

Processing from step S1204 is the same as in the fourth embodiment.

According to this modification, since the coordinates of the designated processing area need not be calculated, further increase in throughput can be expected.

Fifth Embodiment

The fifth embodiment of the present invention will be described below.

In the above-described first to third embodiments, each object in an original image is output after determining whether the object matches the object output condition. However, For example, a user may directly designate an object for which thumbnail output is desired, using a pointing device or the like. In the fifth embodiment, an example in which a user designates objects, and thumbnail output is performed for only the designated objects will be described.

In the fifth embodiment, the image processing system arrangement and color conversion thumbnail printing shown in FIG. 5 are the same as in the above-described embodiments, and a detailed description thereof will be omitted.

Figure 20:
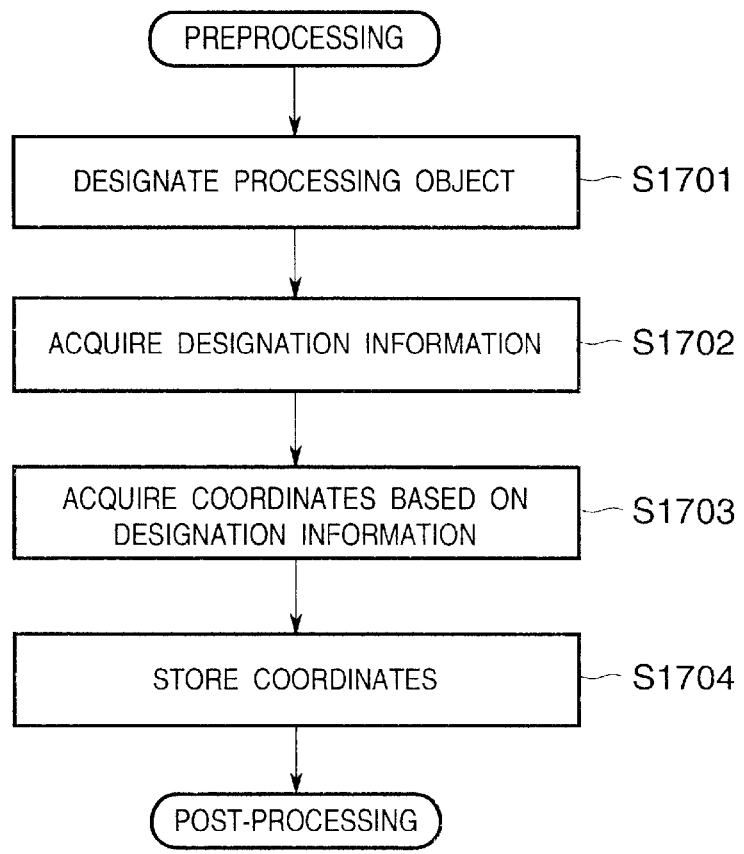
FIG. 20 is a flow chart showing processing object setting processing according to the fifth embodiment of the present invention.

In the fifth embodiment, before color conversion thumbnail printing shown in FIG. 5 is started, an object to be processed in an original image must be set. FIG. 20 is a flow chart showing processing object setting processing, and this will be described below.

Figure 21:
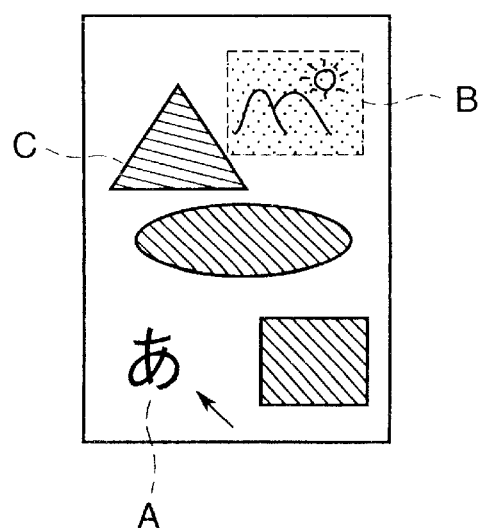
FIG. 21 is a view showing an example of processing object setting in the fifth embodiment.

First, in step S1701, a window such as a print dialogue box for print setting, which is provided by, e.g., a printer driver 203, is displayed on a CRT 10. On this window, an object to be processed is set by the user through a KB 9 or pointing device (not shown) such as a mouse. FIG. 21 is a view showing an example of processing object setting in the fifth embodiment. An arrow in FIG. 21 indicates a position pointed by the pointing device. FIG. 21 shows an original image. The original image is constructed by objects such as a character image A, picture image B, and graphic image C.

In the fifth embodiment, the original image is displayed in the dialogue box on the CRT 10, and the user designates an arbitrary processing object from the plurality of objects.

The flow advances to step S1702 to acquire point information pointing the processing object as, e.g., coordinate information (x,y) of one point. The coordinate information (x,y) can be acquired as a parameter transferred from a printer driver 203 to a spooler 302 through a dispatcher 301 when the processing object is pointed by the pointing device.

In step S1703, coordinates representing the designated processing object area in the original image are acquired. In the original image shown in FIG. 21, the character image A is held as a text drawing command, the picture image B is held as a picture drawing command, and the graphic image C is held as a graphic drawing command. A drawing command contains information such as drawing start coordinates, the width and height of the object, and drawing data. Hence, in step S1703, the object in the original image, in which the designated coordinates are located, is determined, and the entire area of the corresponding object is acquired by analyzing the drawing command of the object. In this way, in the fifth embodiment, the processing object designated in the original image by the user is recognized, and the position coordinates are acquired.

In step S1704, the coordinates acquired in step S1703 are stored. In this processing, data representing the acquired coordinates is stored in a spool file 303, like remaining data necessary for printing. With this processing, data for color conversion thumbnail printing for the designated processing object can be provided in reproducing the print data in a despooler 305. Referring to FIG. 20, processing of acquiring the remaining data for printing is performed in preprocessing and post-processing.

The above-described processing in steps S1702 to S1704 is executed by the spooler 302 and started, e.g., when the spooler 302 receives a print instruction from the dispatcher 301. In this case, the coordinate information designated in step S1701 is temporarily stored in a RAM 2 or the like.

After processing object setting processing shown in FIG. 20 is ended, color conversion thumbnail printing shown in FIG. 5 is started.

Color conversion result output processing in the fifth embodiment can be realized as in the above-described first to fourth embodiments, and a detailed description thereof will be omitted. For example, when the picture image B in the original image shown in FIG. 21 is designated as a processing object, only this object can be reduced and thumbnail-output, as in FIG. 10C of the first embodiment. Alternatively, as shown in FIG. 19C of the fourth embodiment, only this object can be thumbnail-output as one image.

As described above, according to the fifth embodiment, an object is recognized on the basis of a simple designation by the user, and the object can be set as a processing object and thumbnail-printed. Hence, the operability can be further improved.

In the fifth embodiment, an example in which one point in an object is pointed by the pointing device has been described. However, the fifth embodiment is not limited to this example. For example, all objects contained in a rectangular area pointed by the pointing device may be set as processing objects as far as objects can be recognized in the original image on the basis of a user designation. That is, the number of processing objects is not limited to one.

In the above embodiments, a case wherein color conversion results using a plurality of color conversion parameters are thumbnail-printed has been described. However, the present invention is not limited to thumbnail printing. Thumbnail display on a CRT or the like can also be realized.

That is, as long as the user can easily recognize a plurality of color conversion results, the color conversion results may be output onto either print paper sheet or display device.

Even when an original image is subjected to image processing other than color conversion using a plurality of parameters, the thumbnail output method of the present invention can be applied unless the entire original image need be output.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes readout from the storage medium realize the functions of the above-described embodiments by themselves, and the storage medium storing the program codes constitutes the present invention.

As a storage medium for supplying the program codes, a floppy disk, a hard disk, an optical disk, a magneto-optical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts (FIGS. 6, 7, 8, 9, 11, 13, 15, 18, and 20).

The present invention is not limited to the above embodiments and various changes and modifications can be made within the spirit and scope of the present invention. Therefore, to apprise the public of the scope of the present invention, the following claims are made.

What is claimed is:

1. An image processing apparatus for reducing a size of image data, performing a plurality of types of image processing on the image data and laying out a plurality of processed image data in a page, said types of image processing being different from each other, said apparatus comprising:

an input unit arranged to input first image data;

a selection unit arranged to select a partial image, which satisfies a predetermined condition, from among the inputted first image data;

an image processing unit arranged to perform a plurality of types of image processing on a selected partial image to generate a plurality of second image data, each of said types of image processing being different from each other; and a layout unit arranged to lay out a plurality of said second image data in a page, wherein image data other than the partial image which satisfies said predetermined condition is not reproduced on the output image.

2. The apparatus according to claim 1, wherein the image processing is color conversion processing.

3. The apparatus according to claim 1,
further comprising connection means for connecting an external image forming apparatus, and wherein
said output means converts the plurality of second image data into a first form that allows image formation by said image forming apparatus and outputs the second image data.

4. The apparatus according to claim 1, further comprising:
condition input means for inputting a determination condition for determining a partial area of the first image data held by said spool means.

5. The apparatus according to claim 4, wherein the determination condition is an object size.

6. The apparatus according to claim 4, wherein the determination condition is an object color.

7. The apparatus according to claim 4, wherein the determination condition is an object type.

8. The apparatus according to claim 4, wherein the determination condition is a predetermined area.

9. An image processing apparatus for reducing a size of image data, performing a plurality of types of image processing on the image data and laying out a plurality of the processed image data in a page said types of image processing being different from each other, said apparatus comprising:
an input unit arranged to input first image data;
a designation input unit arranged to input a user designation for designating an object in the first image data;
a color conversion unit arranged to perform color conversion processing on the object designated by the user designation using a plurality of parameters to generate a plurality of second image data; and
an output unit arranged to thumbnail-output the plurality of second image data generated by said color conversion unit.

10. The apparatus according to claim 9, further comprising:
recognition means for recognizing an area of the object in the first image data, which is designated by the user designation, and wherein
said color conversion means performs color conversion processing for image data in the area recognized by said recognition means.

11. The apparatus according to claim 10, wherein
said recognition means recognizes the area on the basis of a data form of the object in the first image data, which is designated by the user designation.

12. An image processing method for reducing a size of image data, performing a plurality of types of image processing on the image data and laying out a plurality of processed image data in a page, said types of image processing being different from each other, said method comprising:
an input step, of inputting first image data;
a selection step, of selecting a partial image, which satisfies a predetermined condition, from among the inputted first image data;
an image processing step, of performing a plurality of types of image processing on a selected partial image to generate a plurality of second image data, each of said types of image processing being different from each other; and
a layout step, of laying out a plurality of the second image data in a page, wherein image data other than the partial image which satisfies said predetermined condition is not reproduced on the output image.

13. An image processing method for reducing a size of image data, performing a plurality of types of image processing on the image data and laying out a plurality of the processed image data in a page, said types of image processing being different from each other, said method comprising:
an image data input step, of inputting first image data;
an designation input step, of inputting a user designation for designating an object in the first image data;
an color conversion step, of performing color conversion processing for the object designated by the user designation using a plurality of parameters to generate a plurality of second image data; and
an output step, of thumbnail-outputting the plurality of second image data generated in the color conversion step.

14. A recording medium in which program codes of image processing are recorded, the program codes being for performing a method for reducing a size of image data, performing a plurality of types of image processing on the image data and laying out a plurality of processed image data in a page, said types of image processing being different from each other, the program codes at least comprising:
a code of an input step, of inputting first image data;
a code of a selection step, of selecting a partial image, which satisfies a predetermined condition, from among the inputted first image data,
a code of an image processing step, of performing a plurality of types of image processing on a selected partial image to generate a plurality of second image data, each of said types of image processing being different from each other; and
a code of a layout step, of laying out a plurality of the second image data in a page, wherein image data other than the partial image which satisfies said predetermined condition is not reproduced on the output image.

15. A recording medium in which program codes of image processing are recorded, the program codes being to perform a method for reducing a size of image data, performing a plurality of types of image processing on the image data and laying out a plurality of the processed image data in a page said types of image processing being different from each other, the program codes at least comprising:
a code of an image data input step, of inputting first image data,
a code of an designation input step, of inputting a user designation for designating an object in the first image data,
a code of an color conversion step, of performing color conversion processing for the object designated by the user designation using a plurality of different parameters to generate a plurality of second image data, and
a code of an output step, of changing a size of the plurality of second image data generated in the color conversion step and thumbnail-outputting the second image data on one page.

* * * * *

UNITED STATES PATENT AND TRADEMARK OFFICE
CERTIFICATE OF CORRECTION

PATENT NO. : 6,654,509 B2
DATED : November 25, 2003
INVENTOR(S) : Satoshi Nishikawa et al.

It is certified that error appears in the above-identified patent and that said Letters Patent is hereby corrected as shown below:

<u>Title Page,</u>
Item [57], ABSTRACT, Line 4, "through put" should read -- throughput --.

<u>Column 5,</u>
Line 49, "arrangement-construction" should read -- arrangement construction --.

<u>Column 8,</u>
Line 63, "object" should read -- objects --.

<u>Column 14,</u>
Line 18, "such a" should read -- such as a --; and
Line 42, "For" should read -- for --.

<u>Column 16,</u>
Line 22, "readout" should read -- read out --.

<u>Column 17,</u>
Line 30, "page said" should read -- page, said --.

<u>Column 18,</u>
Line 15, "an" should read -- a --;
Line 17, "an" should read -- a --;
Line 34, "first data" should read -- first image data --;
Line 49, "page" should read -- page --;
Line 54, "an" should read -- a --; and
Line 57, "an" should read -- a --.

Signed and Sealed this

Eighth Day of June, 2004

JON W. DUDAS
*Acting Director of the United States Patent and Trademark Office*